US009183313B2

(12) United States Patent
Giniger et al.

(10) Patent No.: US 9,183,313 B2
(45) Date of Patent: Nov. 10, 2015

(54) METHOD AND APPARATUS FOR PROVIDING POSITION-RELATED INFORMATION TO MOBILE RECIPIENTS

(75) Inventors: Michael L. Giniger, Groton, MA (US); Warren Scott Hilton, Groton, MA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/051,631

(22) Filed: Mar. 18, 2011

(65) Prior Publication Data
US 2011/0250907 A1 Oct. 13, 2011

Related U.S. Application Data

(63) Continuation of application No. 11/855,112, filed on Sep. 13, 2007, which is a continuation of application No. 11/059,397, filed on Feb. 17, 2005, now Pat. No. 7,286,837, which is a continuation of application No.
(Continued)

(51) Int. Cl.
*H04W 24/00* (2009.01)
*G06F 17/30* (2006.01)
(Continued)

(52) U.S. Cl.
CPC ............ *G06F 17/3087* (2013.01); *H04L 67/18* (2013.01); *H04W 4/02* (2013.01)

(58) Field of Classification Search
USPC ........ 455/424, 425, 456.5, 456.6, 561, 550.1, 455/575.1, 456.3, 456.1, 456.2, 414.2, 455/414.3, 426.1, 426.2, 457, 556.2, 566, 455/422.1, 420, 453.1, 440, 418, 419, 458, 455/556.1, 572; 379/45, 48, 50, 51, 58; 701/201, 208, 211, 209, 212, 213, 207; 340/995, 825.49; 342/357.06, 450, 342/457, 449, 357.75
See application file for complete search history.

(56) References Cited

U.S. PATENT DOCUMENTS

| | | |
|---|---|---|
| 4,114,115 A | 9/1978 | Minnis |
| 4,812,843 A | 3/1989 | Champion, III |

(Continued)

FOREIGN PATENT DOCUMENTS

| | | |
|---|---|---|
| EP | 0511447 A2 | 11/1992 |
| WO | WO9933292 A1 | 7/1999 |

OTHER PUBLICATIONS

"Auto Update," Better Homes and Garden, pp. 214, Jul. 1995.
(Continued)

*Primary Examiner* — Ankur Jain
(74) *Attorney, Agent, or Firm* — Thien T. Nguyen

(57) ABSTRACT

A system for providing position-related information to a mobile user includes a mobile unit and a central site server. The mobile unit includes circuitry for determining present position information from position signals which may emanate from, for example, GPS satellites. The mobile unit further includes circuitry for establishing a wireless bidirectional communications link with the central site server via a terrestrial network, which may be accessed via a cellular telephone network. The central site server includes circuitry for receiving the present position information from the mobile unit. A table stored at the central site server includes different response information in correspondence with possible positions of the mobile unit. The response information may further be in correspondence with user preferences. The central site server uses the received present position information to retrieve corresponding response information from the table, and sends the retrieved response information to the mobile unit via the bidirectional communications link. The mobile unit further includes circuitry, such as a loudspeaker, for supplying the response information to the mobile user. In another aspect of the invention, communications between the mobile unit and the central site server are encrypted. Furthermore, the mobile unit may include components for preventing position information from being supplied to the loudspeaker, thereby eliminating distracting noise from being presented to the user.

28 Claims, 10 Drawing Sheets

Related U.S. Application Data

09/652,793, filed on Aug. 31, 2000, now Pat. No. 6,985,742, which is a continuation-in-part of application No. 08/698,148, filed on Aug. 15, 1996, now Pat. No. 6,199,045.

(51) Int. Cl.
*H04W 4/02* (2009.01)
*H04L 29/08* (2006.01)

(56) References Cited

U.S. PATENT DOCUMENTS

| | | | |
|---|---|---|---|
| 4,972,510 | A | 11/1990 | Guizerix et al. |
| 5,025,261 | A | 6/1991 | Ohta et al. |
| 5,109,399 | A | 4/1992 | Thompson |
| 5,235,633 | A | 8/1993 | Dennison et al. |
| 5,289,184 | A | 2/1994 | Suzuki |
| 5,353,023 | A | 10/1994 | Mitsugi |
| 5,365,451 | A | 11/1994 | Wang et al. |
| 5,396,254 | A | 3/1995 | Toshiyuki |
| 5,396,540 | A | 3/1995 | Gooch |
| 5,406,492 | A | 4/1995 | Suzuki |
| 5,410,486 | A | 4/1995 | Kishi et al. |
| 5,428,546 | A | 6/1995 | Shah et al. |
| 5,438,695 | A | 8/1995 | Morimura et al. |
| 5,438,700 | A | 8/1995 | Hashimoto et al. |
| 5,479,482 | A | 12/1995 | Grimes |
| 5,543,789 | A | 8/1996 | Behr et al. |
| 5,550,551 | A | 8/1996 | Alesio |
| 5,555,376 | A | 9/1996 | Theimer et al. |
| 5,559,520 | A | 9/1996 | Barzegar et al. |
| 5,561,704 | A | 10/1996 | Salimando |
| 5,565,874 | A | 10/1996 | Rode |
| 5,577,122 | A | 11/1996 | Schipper et al. |
| 5,579,535 | A | 11/1996 | Orlen et al. |
| 5,594,425 | A | 1/1997 | Ladner et al. |
| 5,625,668 | A | 4/1997 | Loomis et al. |
| 5,648,768 | A | 7/1997 | Bouve |
| 5,677,837 | A | 10/1997 | Reynolds |
| 5,703,598 | A | 12/1997 | Emmons |
| 5,731,785 | A * | 3/1998 | Lemelson et al. ........ 342/357.31 |
| 5,742,509 | A | 4/1998 | Goldberg et al. |
| 5,742,924 | A | 4/1998 | Nakayama |
| 5,774,827 | A | 6/1998 | Smith, Jr. et al. |
| 5,802,492 | A | 9/1998 | Delorme et al. |
| 5,806,018 | A | 9/1998 | Smith et al. |
| 5,808,566 | A | 9/1998 | Behr et al. |
| 5,835,907 | A * | 11/1998 | Newman ........................ 340/7.5 |
| 5,850,618 | A | 12/1998 | Suetsugu et al. |
| 5,930,729 | A | 7/1999 | Khamis et al. |
| 5,948,040 | A | 9/1999 | Delorme et al. |
| 5,959,577 | A | 9/1999 | Fan et al. |
| 6,026,400 | A | 2/2000 | Suzuki |
| 6,047,327 | A | 4/2000 | Tso et al. |
| 6,049,711 | A | 4/2000 | Ben-Yehezkel et al. |
| 6,101,483 | A | 8/2000 | Petrovich et al. |
| 6,199,045 | B1 | 3/2001 | Giniger et al. |
| 6,199,753 | B1 | 3/2001 | Tracy et al. |
| 6,202,023 | B1 | 3/2001 | Hancock et al. |
| 6,205,126 | B1 | 3/2001 | Moon |
| 6,236,365 | B1 | 5/2001 | Leblanc et al. |
| 6,295,454 | B1 | 9/2001 | Havinis et al. |
| 6,414,630 | B1 * | 7/2002 | Usui ........................ 342/357.31 |
| 6,522,875 | B1 | 2/2003 | Dowling et al. |
| 6,760,770 | B1 | 7/2004 | Kageyama |
| 6,985,742 | B1 | 1/2006 | Giniger et al. |
| 7,286,837 | B2 | 10/2007 | Giniger et al. |
| 7,432,830 | B2 | 10/2008 | Behr et al. |
| 2002/0068549 | A1 | 6/2002 | Tendler |
| 2008/0102858 | A1 | 5/2008 | Giniger et al. |

OTHER PUBLICATIONS

"Bell Atlantic Announces the Rollout of Info travel T at Washington DC Marriott and Hilton Hotels," PR New wire, Bethesda, MD, Aug. 3, 1994 (Via: Dialog).

International Search Report—PCT/US97/12916—International Search Authority, European Patent Office, Jan. 30, 1998.

"Lost? This car phone knows where you are," Business Week, Jan. 18, 1993, p. 74.

News Release by Pinpoint Communications Inc., Richardson, TX, Aug. 31, 1992 (Via: Dialog).

News Release by Qualcomm, Inc., San Diego, CA, Feb. 5, 1990 (Vis:Dialog).

Peter Tyson, "High-Tech Help for the Blind," Technology Review pp. 19-21, Apr. 1995.

P.J. Klass "Motorola's Iridium Satellite Could Serve Aviation Market," Aviation Week & Space Technology, Jun. 3, 1991, p. 80, vol. 134, No. 22.

"Satellite links for the masses; the final frontier?: Through new use of the L band, satellite will make connections in real time, with individuals and application on the move—anywhere in the world," Data Communications, Nov. 1988. p. 179, vol. 17, No.

"The Emerging Specialized Mobile Radio Market," Telecom Market, Telecom Market Letter, May 28, 1993, p. 25, vol. 14, No. 4, ISSN: 0712-3663.

"Trimble Exclusive Satellite Data Terminal Supplier for American Mobile Satellite Corporation," PTS New Product Announcement/Plus, Sunnvale, CA, Jul. 6, 1993 (Via: Dialog).

Dialog).

\* cited by examiner

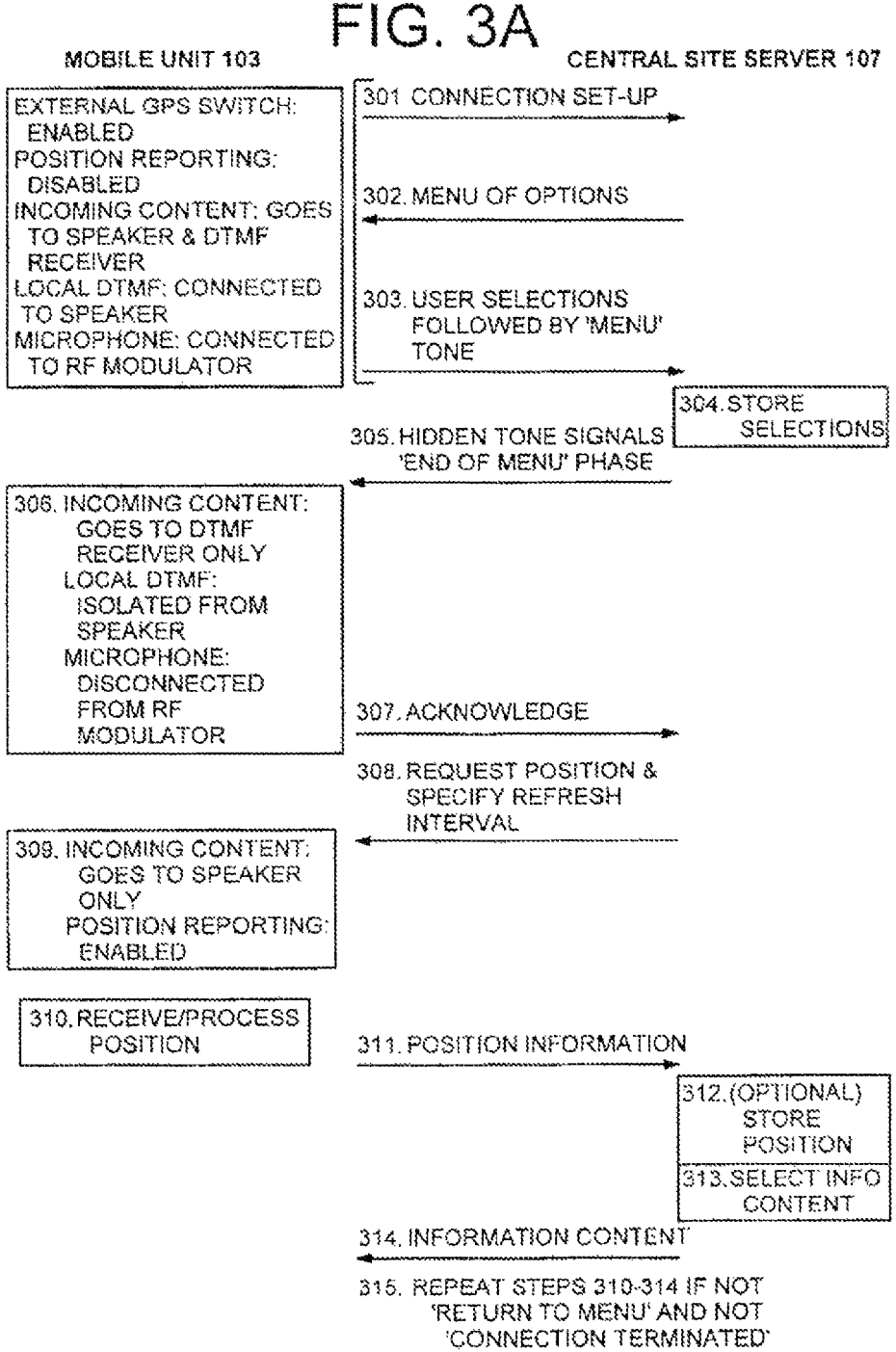

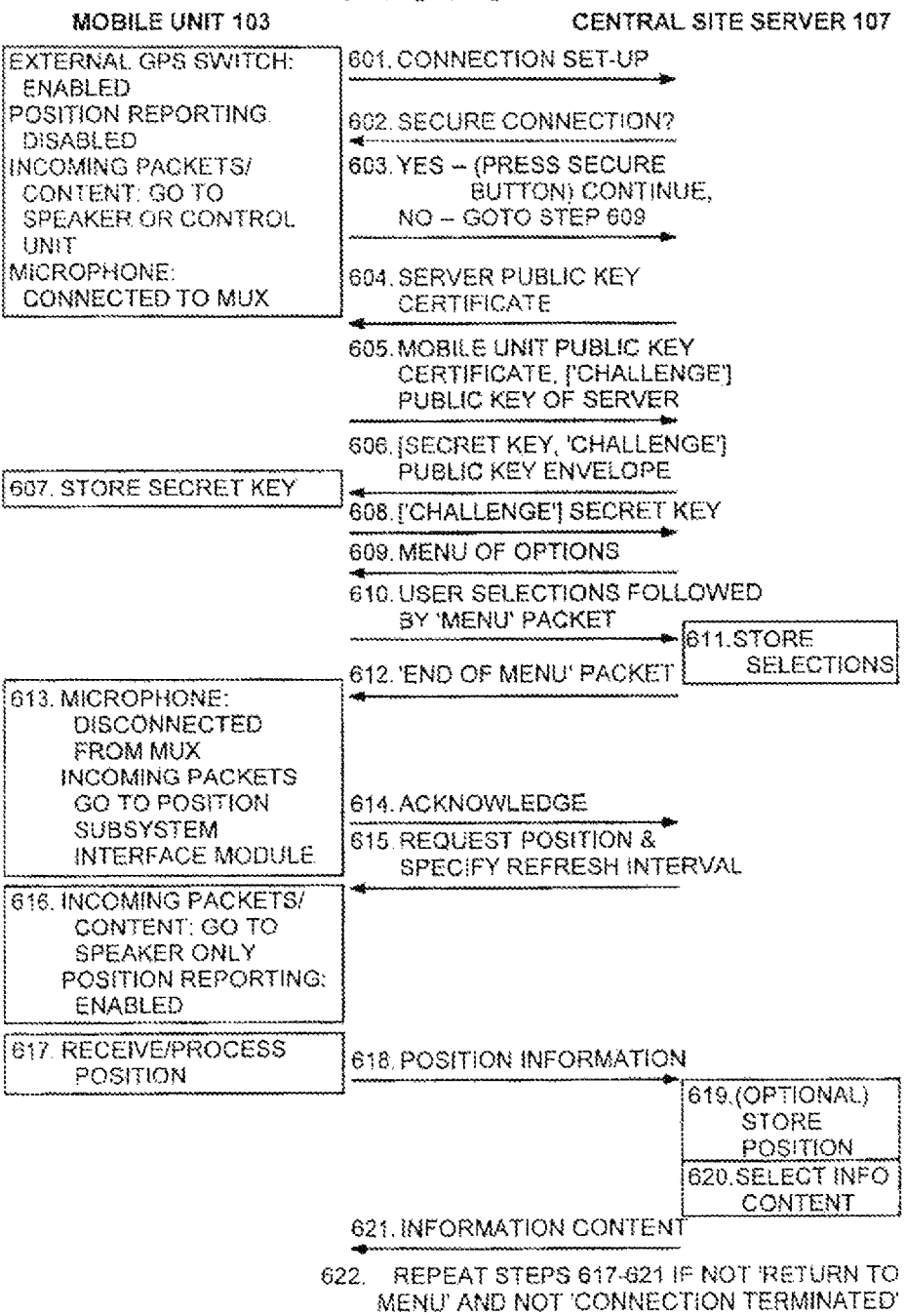

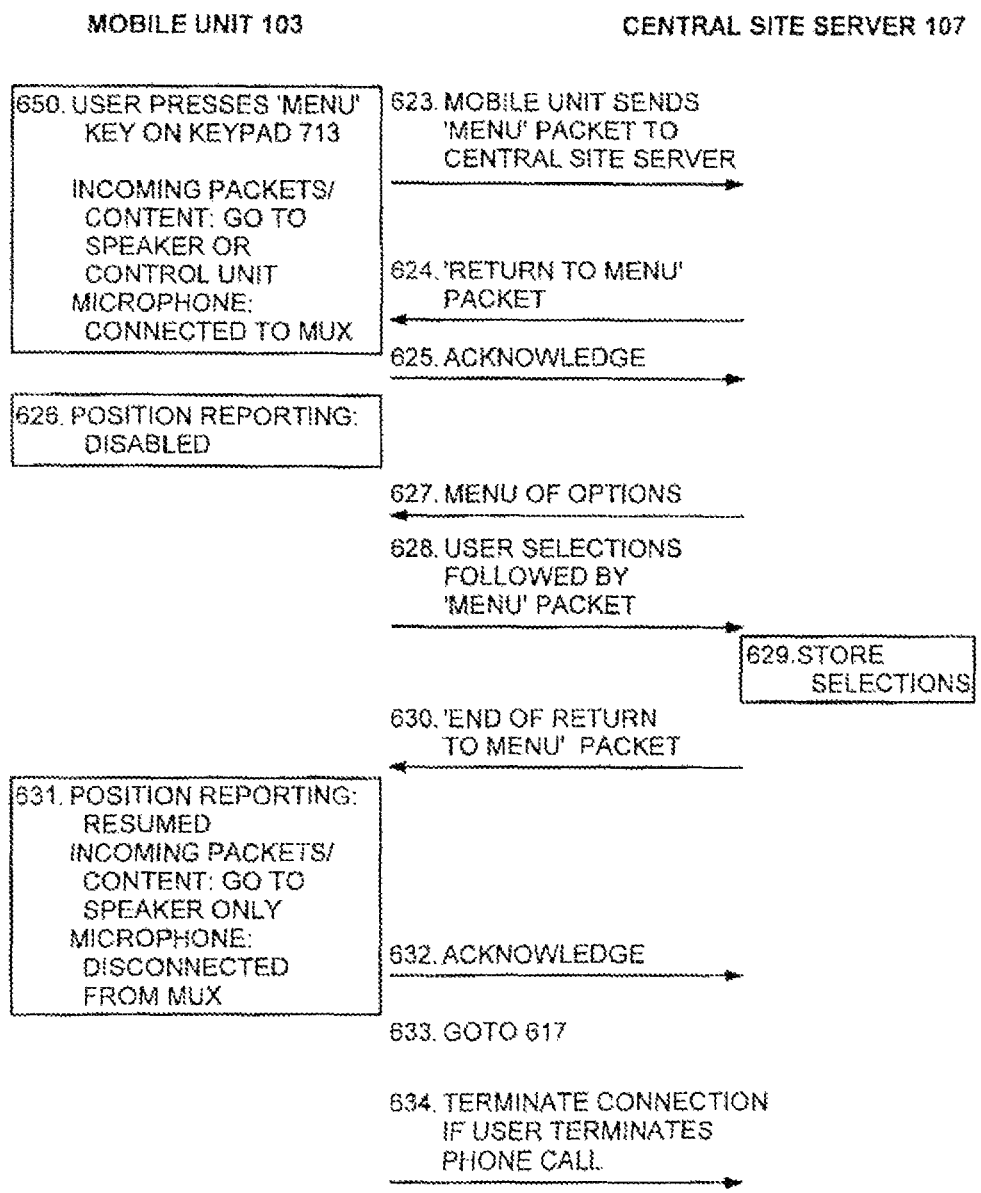

METHOD AND APPARATUS FOR PROVIDING POSITION-RELATED INFORMATION TO MOBILE RECIPIENTS

CLAIM OF PRIORITY UNDER 35 U.S.C. §120

This application is a Continuation of, and claims priority under 35 U.S.C. §120 to, U.S. application Ser. No. 11/855,112, filed 13 Sep. 2007, entitled "Method And Apparatus For Providing Position-Related Information To Mobile Recipients", by the inventors hereof, which is a Continuation of, and claims priority under 35 U.S.C. §120 to, U.S. application Ser. No. 11/059,397, filed 17 Feb. 2005, entitled "Method And Apparatus For Providing Position-Related Information To Mobile Recipients", by the inventors hereof, now U.S. Pat. No. 7,286,837, which is a Continuation of, and claims priority under 35 U.S.C. §120 to, U.S. application Ser. No. 09/652,793, filed 31 Aug. 2000, entitled "Method And Apparatus For Providing Position-Related Information To Mobile Recipients", by the inventors hereof, now U.S. Pat. No. 6,985,742, which is a Continuation of, and claims priority under 35 U.S.C. §120 to, U.S. application Ser. No. 08/698,148, filed 15 Aug. 1996, entitled "Method And Apparatus For Providing Position-Related Information To Mobile Recipients", by the inventors hereof, now U.S. Pat. No. 6,199,045 B1, all of which are assigned to the assignee hereof, the entireties of all of which are incorporated by reference herein.

BACKGROUND

The invention relates to mobile information systems, and more particularly to systems and methods for providing information to mobile users, which information is based upon the user's position and tailored to the user's interests.

For a number of reasons, it may be desirable to dynamically provide a mobile user with information that is particularly related to the user's present location. Such reasons may include, but are not limited to, the desire to assist and/or inform the user as he or she tours a particular locale or exhibit, and the desire to assist the user as he or she attempts to navigate from one location to another. A number of techniques for providing such position-related information are known, and will now be described.

To begin with, a variety of methods have been employed for the purpose of presenting observers with information that is related to exhibits (e.g., art displays, zoological displays, and the like) or sights (e.g., tours of historic sights, natural wonders, urban settings, theme parks, and the like) which are in the proximate vicinity of the observer and for guiding or controlling the observer's physical movements through an exhibit, display, or geographic locale. The most common and most widely used of these presentation and touring methods include:

Guided tours in which the customer accompanies a tour guide on a walking tour or in a vehicle (e.g., bus, boat, helicopter);

Personal tours in which the sightseer reads a brochure and follows a map or floor plan;

Personal tours in which the sightseer reads informative sign boards, or obtains information from a kiosk or diorama;

Loudspeaker broadcasts of information at preselected (i.e., fixed) locations;

Portable playback devices rented by the sightseer which play an audio tape, compact disk, or video tape; and Portable receivers rented by the sightseer which trigger short range infrared (or similar technology) transmitters located at various points of the exhibit, and which play back a description keyed to the location of the transmitter.

The above-mentioned techniques variously suffer from one or more of the following drawbacks: 1) a lack of automation, such as in the case of human tour guides; 2) a failure to detect the user's location, thereby requiring the user to expend some effort to ensure receipt of the appropriate information at the right time; 3) an inability to provide information at more than a few fixed locations; and an inability of the user to select the type of information that will be received at any given location.

Recognizing the increasing mobility of society and the growing need and quest for concise, rapid, accurate and readily available information, the proprietors of information and entertainment venues, aircraft and automobile manufacturers, electronic equipment providers, and recreational equipment providers have attempted to install or provide access to on-demand information. These providers have come to realize that people prefer on-the-spot information at a time and place of their own choosing that is relevant to their current location and tailored to their particular interests.

Several types of devices and equipment have been created which have attempted to afford the user freedom from interpreting written material. Guided and unguided tours, for example, employ pre-positioned audio and video information which is delivered when the user either pushes a button to announce his presence or when his approach is detected by the triggering of a sensor. Such a system readily determines that a viewer is at a particular predefined location. However, the system is limited in that position-based information is restricted to those locations at which the provider can economically and practically position the sensor stations. Users who are proceeding in a vehicle or are, of necessity, continually on the move either cannot maintain contact with the fixed information source or will quickly find themselves located at a point where the provided information is no longer relevant. Another drawback stems from the fact that the quality of the audio or video at fixed stations is dependent on close proximity to the location, and tends to deteriorate with continuous usage.

Tour bus and van manufacturers have installed audio and visual devices which can provide position related tour and scenic information keyed to the vehicle's location as determined by the driver or tour guide. Listeners use channel selectors mounted to their seats to select what prerecorded information they will receive in their headsets or monitors. This system provides whatever information the tour company has preselected and the staff must either continually correlate the content with the position of the vehicle or prepare a sequential presentation of content that will hopefully match the predicted position of the vehicle.

A class of individual and personal mobile information systems have also been created based on "on-board" storage technologies and the use of signs, sensors, and user inputs to establish the current position of the vehicle or individual. The position information, which may be automatically obtained via the fixed sensor or else manually determined by the individual from external signs, maps, and the like, and then entered by means of a keyboard or selection switch, triggers the playback device to output the corresponding audio or visual information stored locally (on-board or on the individual) on an audio cassette, compact disk (CD) read only memory (ROM), compact disc, or similar storage system.

The drawback with systems whose position information is derived from fixed sensors and signs is that they tend to be obtrusive and, as a practical matter, the scope of their coverage is limited to those locations where they may be feasibly and legally placed.

The drawback with on-board systems requiring user involvement in the determination and inputting of current location is that the conduct of these activities may be distracting and even dangerous, particularly if the user is mobile and responsible for the safe control of a vehicle.

The advent of universal and accurate navigation systems, such as the global positioning system (GPS), has made it possible to rapidly determine the position of a mobile object or individual with high precision. For background information on these techniques, reference may be made to U.S. Pat. No. 4,114,115 and its included references. Briefly, a plurality of artificial satellites are utilized so that at least four observed satellites are always capable of providing a mobile receiver with a meaningful signal with which to determine orbiting data of each satellite. The present position of each satellite is obtained by applying detected orbit data to solve Kepler's equation. A distance from the ground-based mobile object to each satellite can be obtained by measuring the propagation time of the signal transmitted from the satellite. The mobile receiver's present position is determined by the solution of simultaneous equations relating the position of each of the multiple satellites with the distance between the mobile receiver and each respective observed satellite. The resulting position information is displayed to the user as his location at the time of observation.

Such capabilities enable accurate and rapid determination of current position by people at fixed positions or on the move. The advent of this technology means that the traveler need no longer be dependent upon pre-positioned sensors or upon the manual determination and inputting of current location to provide the position trigger for information sources such as those described above. As a result, a number of systems have been devised which allow the occupant of a mobile vehicle to retrieve information contained on an installed cassette tape, compact disk or similar storage device, which information is based on the accurate GPS position data entered into an onboard computer. Such systems are particularly suited for mobile navigation as employed, for example, in the system described in U.S. Pat. No. 5,396,254. This system incorporates a position recognition system and an onboard map or location database. While this system provides map information generated from an onboard database including the display of the mobile unit's current position and surrounding geographic features, another system described in U.S. Pat. No. 5,410,486 goes further to display onboard generated routing information for locations specified by the operator. Yet another system is described in U.S. Pat. No. 5,406,492, wherein audio instructions derived from an onboard computer processing unit (CPU) are provided to the traveler to effect preselected routing, thereby freeing the operator from interpreting visual instructions and pictorial information as required in the system described in U.S. Pat. No. 5,410,486.

Also known in the art is a personal guidance system for blind pedestrians developed by Jack Loomis, Reginald Golledge, and Roberta Klatzky, as described in P.

Tyson, "High-Tech Help for the Blind", Technology Review pp. 19-21, April 1995. As described in this article, the system incorporates a GPS monitor, laptop computer, headphones, and associated equipment into a twenty-eight pound backpack unit which is intended to be worn by a blind pedestrian. As the pedestrian walks through an area, the GPS information is used by the computer to retrieve, and deliver to the user, audio information indicating the structures and landmarks in current proximity to the pedestrian.

The disadvantage in each of these systems is that the derivation of information from an on-board storage device necessitates the collection and entry of that information into the computer's mass storage device long before the journey is commenced. Consequently, the routing guidance and other information is based on static information from the moment it is entered into the database of the onboard system. If the information is of a perishable nature, such as in the nature of highway traffic conditions, construction and repair progress, seasonal availability or cost information, the on-board database is only as good as the most recent edition received and loaded by the user.

Equally limiting is the scope and breadth of the onboard database. Normally entered into a finite space and capacity, any travel beyond the dimensions of the loaded data is of necessity unsupported by the installed information system.

Furthermore, in the case of the personal guidance system for blind pedestrians, the employment of "on-board" processing and storage of the information database necessitates that the pedestrian constantly carry the "on-board" equipment from location to location.

The limitations suffered by solutions relying on on-board information storage systems are partially addressed in U.S. Pat. No. 4,812,843 to Champion et al. In a described embodiment, this traffic information system permits direct access to information maintained and kept current by a service provider. Information concerning the current status of traffic conditions along a specific metropolitan commuter route is maintained in a high capacity dynamic data base and is available to customers on demand. Additional information reports which may be of interest to a subscriber, including airline flight and surface travel information as well as stock information, may be queried. Subscribers are provided such information by wireline telephone, mobile telephone, or computer.

The employment of a centralized information system which is remotely located from the mobile vehicle solves the problem of local storage limitations and additionally permits the provider to rapidly update the information disseminated to customers. However, the system described in U.S. Pat. No. 4,812,843 requires that subscribers personally determine their current position and provide that position information via the input device, whether that be digitally via modem or via a dual tone multiple frequency (DTMF) capable telephone. In addition, the travel information system is geared specifically toward urban vehicular commuters by providing information on traffic conditions and optimum routing given those conditions. The system does not address the needs of pedestrians including tourists, travelers, students, and the local populace in general for a broad range of position-dependent information in urban, rural or remote locations.

As described in Better Homes and Gardens p. 214, July 1995, another known system utilizes GPS technology to locate the current position of a vehicle and to use this information provide an emergency service. At the touch of a button, buyers of the 1996 Lincoln Continental automobile (manufactured by the Ford Motor Company) will be able to access a worldwide emergency tracking system. This system, which is known as the Remote Emergency Satellite Cellular Unit (RESCU), uses global positioning satellite technology and the cellular phone network to put a driver in voice contact with an operator at a special response center. The operator at the response center pinpoints the vehicle's location, guides the appropriate emergency service to the vehicle, and stays in voice communication with the customer until help arrives. A special password setup protects against false alarms or unauthorized attempts to turn the system off.

In essence, the RESCU system provides an enhanced version of the standard 911 emergency call in which the location of the customer is automatically relayed to the emergency center instead of being verbally communicated by the customer over the voice circuit. As such, the RESCU system is an emergency service for vehicular customers that utilizes GPS positioning technology. It should be noted, however, that the information content received by the customer is in all relevant aspects identical to that which would be received by a customer using a wireline or cellular phone to make a standard 911 call. That is, the information is not automatically retrieved from a data base as a function of the caller's position, but rather is whatever the operator at the response center happens to say to the caller. Thus, the position information is only relevant with respect to the dispatch of emergency personnel and is largely unrelated to the information content received by the vehicular customer. Additionally, the RESCU system is designed specifically to serve customers riding in properly equipped automobiles and is not applicable to pedestrians in distress.

SUMMARY

It is therefore an object of the present invention to provide a system that delivers information which is related to the accurate position of the information seeker.

It is another object of the invention to provide the position-related information with minimal effort expended by the user in determining his accurate position.

It is yet another object of the invention to provide user-selectable position-related information on a broad range of topics or interests.

It is still another object of the invention to provide position-related information to users who may be anywhere in a broad geographic area served by mobile communications providers.

It is yet another object of the invention to provide position-related information on a continuous basis at any hour or in any climatic condition.

It is still another object of the invention to provide dynamically changeable position-related information by means of a fully automated, centrally maintained facility to ensure accuracy, completeness and timeliness.

It is yet another object of the invention to provide a position-related information delivery service to users (vehicle occupants or pedestrians) by means of lightweight, highly portable and easily employed equipment.

It is still another object of the invention to extend the position-related information delivery service to third parties in support of emergency and life support actions on behalf of the subscriber.

It is yet another object of the invention to provide a position-related information delivery service to subscribers in a mode requiring minimal visual observation and interpretation on the part of the subscribers.

It is another object of the invention to provide a position-related information delivery service that supports the presentation of text, graphics, and images to subscribers.

Further objects and advantages of the invention are to provide a position-related information delivery service which is unobtrusive to the environment surrounding the user, safely employable, expandable to all areas where wireless communications capability may extend, available to collocated and interested travelers, and which is responsive to emergency conditions and supportive of regional or national emergency planning.

In accordance with one aspect of the present invention, the foregoing and other objects are achieved in an apparatus for providing position-related information to a mobile user. The apparatus comprises a mobile unit and a central site server. The mobile unit includes means for receiving position signals; means for determining present position information from the position signals; and wireless means for establishing a bidirectional communications link with a central site server via a terrestrial network. In a preferred embodiment, the bidirectional communications link is established through a cellular telephone network coupled to a public switched telephone network or public data network. The mobile unit further includes means for sending the present position information to the central site server via the bidirectional communications link; means for receiving response information from the central site server via the bidirectional communications link; and means for supplying the response information to the mobile user. The central site server comprises means for coupling to the terrestrial network; means for receiving the present position information from the mobile unit via the bidirectional communications link; means for storing a plurality of response information, each response information corresponding to a particular position; means for using the received present position information to retrieve corresponding response information from the storing means; and means for sending the retrieved response information to the mobile unit via the bidirectional communications link.

In another aspect of the invention, the central site server supplies the mobile unit with a menu of user. information-type possibilities. The user makes a selection by, for example, pressing a key on the mobile unit's keypad, and thereby generates a menu selection signal. The menu selection signal is then sent to the central site server via the bidirectional communications link. The central site server receives the menu selection signal from the mobile unit via the bidirectional communications link, and uses this in conjunction with the position information to retrieve corresponding response information from the storing means.

In another aspect of the invention, communications between the mobile unit and the central site server are encrypted. Accordingly, the mobile unit's means for sending the present position information to the central site server comprises means for encrypting the present position information; and means, coupled to the encrypting means, for sending the encrypted present position information to the central site server. Furthermore, the mobile unit's means for receiving response information from the central site server comprises means for receiving encrypted response information from the central site server; and means, coupled to the encrypted response information receiving means, for decrypting the encrypted response information. The central site server's means for receiving the present position information from the mobile unit comprises means for receiving the encrypted present position information via the bidirectional communications link; and means, coupled to the encrypted present position information receiving means, for decrypting the encrypted present position information. The central site server's means for sending the retrieved response information to the mobile unit comprises means for encrypting the retrieved response information; and means, coupled to the retrieved response information encrypting means, for sending the encrypted retrieved response information to the mobile unit via the bidirectional communications link.

In accordance with another aspect of the invention, the mobile unit further comprises means for receiving a request position command from the central site server via the bidirectional communications link; and means, coupled to the present position determining means and to the request position command receiving means, for causing the present position determining means to initiate operation in response to receipt of the request position command. Furthermore, the central site server further comprises means for sending the request position command to the mobile unit via the bidirectional communications link.

In yet another aspect of the invention, the mobile unit further comprises a timer; and means, coupled to the timer, for periodically sending updated position information to the central site server via the bidirectional communications link. The mobile unit may also include means for receiving a position refresh interval value from the central site server via the bidirectional communications link; and means for loading the position refresh interval value into the timer. In this embodiment, the central site server further comprises means for sending the position refresh interval value to the mobile unit via the bidirectional communications link. In this way, the position refresh rate of the mobile unit can be set by the central site server.

In an alternative embodiment, the mobile unit further comprises means for receiving a position refresh interval value from the mobile user; and means for loading the position refresh interval value into the timer. Thus, in this embodiment, the user has control of the position refresh rate.

In other aspects of the invention, the mobile unit may process the position information to generate position coordinates, which are sent to the central site server. Alternatively, the position signals themselves may be transmitted from the mobile unit to the central site server. In this case, the central site server has the ability to generate position coordinates from the position signals.

In still another aspect of the invention, the position-related information distribution system may be used for providing assistance in emergency situations. That is, the central site server may further include means for establishing a second communications link with an operator via the terrestrial network. The operator may be, for example, an emergency service provider. The central site server may further include means for sending the present position information to the operator via the second communications link; and means for transferring the bidirectional communications link to enable communication directly between the mobile unit and the operator. With this arrangement, the user may be in direct contact with an emergency service provider, and the emergency service provider may receive up-to-the-minute information about where the user is.

In other aspects of the invention, the mobile unit may alternatively be configured to send/receive analog data and voice over either an analog or digital wireless infrastructure or to send/receive digital data and voice packets over a digital wireless communications infrastructure. Also, the mobile unit may include isolation means for preventing the present position information from being supplied to a loudspeaker in the mobile unit, thereby eliminating distracting noise from being presented to the user.

Furthermore, the mobile unit may periodically send updated position information to the central site server. The rate at which information is refreshed may be set by the user, or alternatively set by the central site server. In the latter case, the central site server sends the refresh rate to the mobile unit via the bidirectional communications link.

In another aspect of the invention, the mobile unit may be provided with a switch to allow the user to alternatively enable or disable operation of the present position information sending means.

DESCRIPTION OF THE DRAWINGS

The objects and advantages of the invention will be understood by reading the following detailed description in conjunction with the drawings in which:

FIGS. 3A and 3B depict a flowchart of the operation of an exemplary embodiment of the inventive position-related information delivery system in accordance with an analog embodiment of the invention;

FIGS. 6A and 6B depict a flowchart of the operation of a mobile unit and a central site server in accordance with a digital embodiment of the invention;

DETAILED DESCRIPTION OF EXEMPLARY EMBODIMENTS

Figure 1:
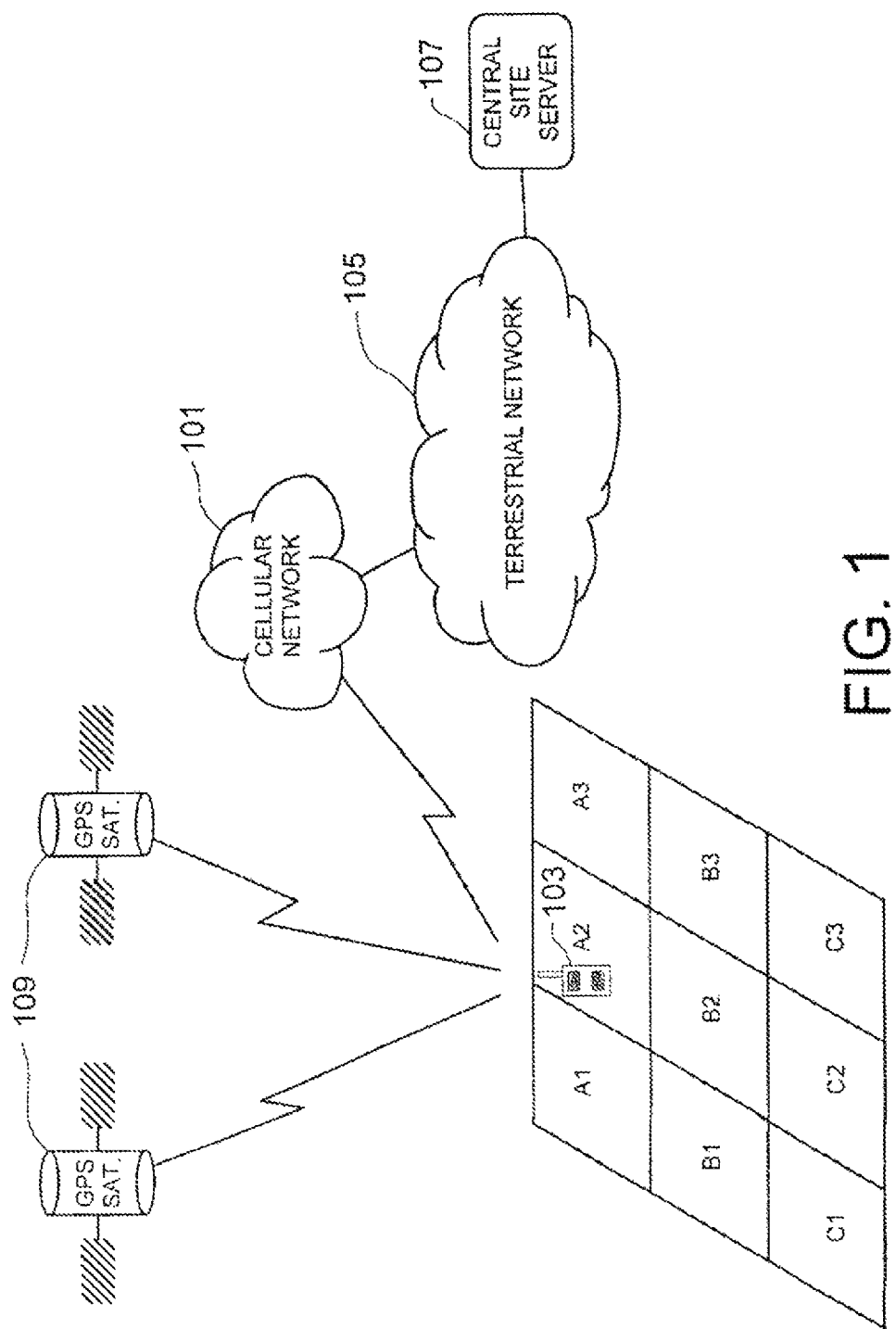
FIG. 1 is a block diagram of a system for delivering position-related information to a mobile user in accordance with one embodiment of the invention.

The various features of the invention will now be described with respect to the figures, in which like parts are identified with the same reference characters.

An exemplary embodiment of a system for delivering position-related information to a mobile user will now be described with respect to FIG. 1. The exemplary system includes a cellular telephone network 101 for providing mobile communications service to a mobile unit 103 located anywhere within a predefined geographical cellular service area. In alternative embodiments, other types of mobile communications systems may be substituted for the cellular telephone network 101, such as low earth orbit satellite communications systems in which a satellite may be in direct communication with the mobile unit 103. A more detailed description of the various mobile communications systems mentioned above, which are well-known, is beyond the scope of this discussion.

The cellular telephone network 101 is coupled to a terrestrial network 105, and is capable of initiating and receiving calls to and from the terrestrial network 105 in accordance with known techniques. The terrestrial network may be, for example, a public switched telephone network (PSTN).

In accordance with one aspect of the invention, a central site server 107 is provided which has a private branch exchange (PBX) that is accessible by way of the terrestrial network 105. The central site server 107 is also supplied with a voice response unit (VRU) for providing voice oriented service. If data oriented service is to be provided, the central site server 107 may alternatively have a remote access server that is accessible by way of the terrestrial network. The primary purpose of the central site server 107 is to determine the nature of the information being requested by the mobile unit 103, and to select, from the type of information requested, that subset of information which is related to the mobile unit's present geographical location. Information about the mobile unit's present geographical location may be derived by means of known equipment, located within the mobile unit 103, for processing GPS signals received from GPS satellites 109. A detailed description of this well-known position-determining processing is beyond the scope of this description.

Figure 2:
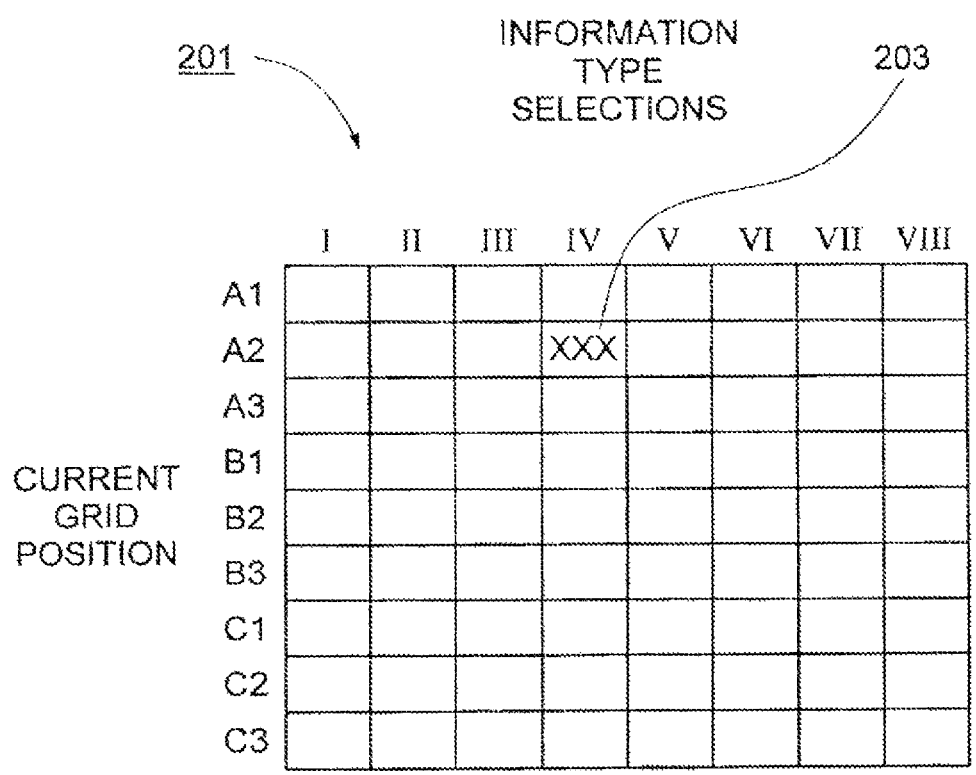
FIG. 2 is a diagram of a selection/position table in accordance with one aspect of the invention.

In the illustrative embodiment, the position information identifies the mobile unit 103 as being located within any one of the geographical areas identified as A1, A2, A3, B1, B2, B3, C1, C2 and C3. In the example, the mobile unit 103 is located in geographical area A2. Of course, in practice the number of geographical areas may be fewer or many more than the nine illustrated. After obtaining the information type and position information, the central site server 107 selects the appropriate subset of information 203 from a selection/position table 201, as illustrated in FIG. 2. The selected subset of information 203 is then transmitted to the mobile unit 103, as described in greater detail below.

Figure 3B:
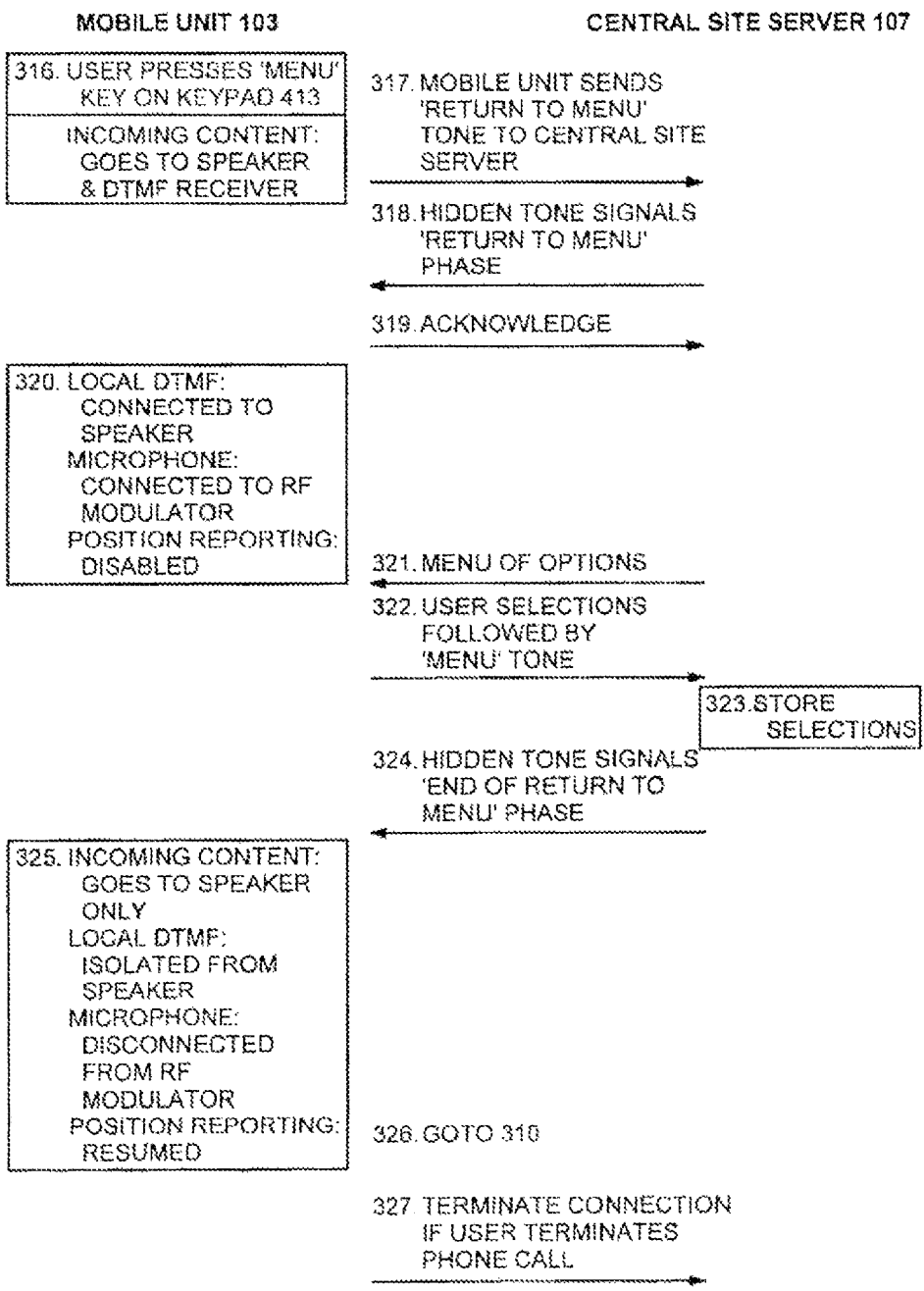
Figure 4:
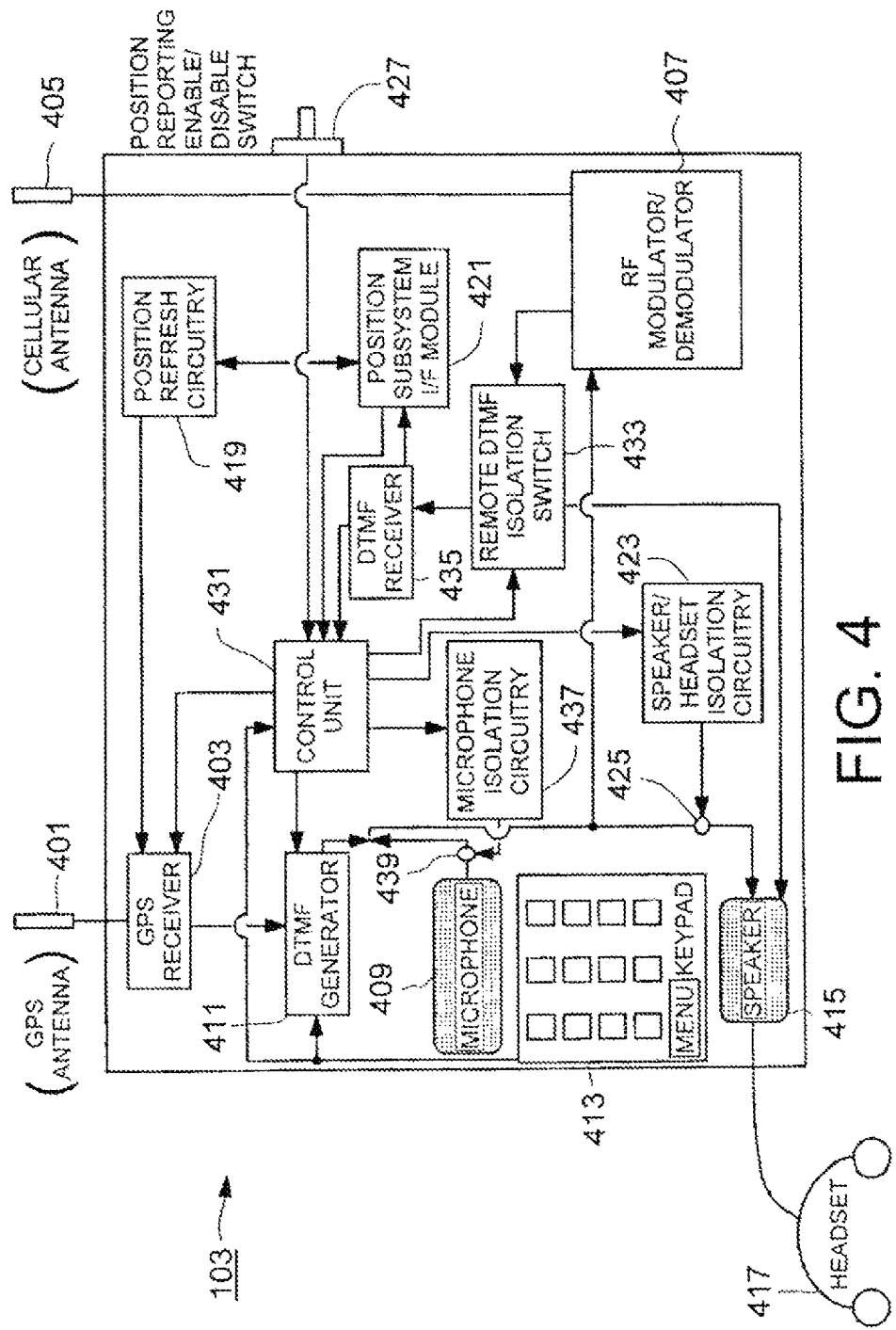
FIG. 4 is a block diagram of an exemplary mobile unit for use in an analog position-related information delivery system.

A more detailed description of the operation of the exemplary system will now be described with respect to the flowchart depicted in FIGS. 3A and 3B, and an exemplary embodiment of a mobile unit 103, which is depicted in FIG. 4. In this first-described embodiment, the cellular telephone network 101, as well as the circuitry within mobile unit 103 which communicates with the cellular telephone network 101, utilize an analog protocol, such as the Advanced Mobile Phone Service (AMPS) which is utilized in the United States. The description herein refers only to select components of the mobile unit 103. However, it should be understood that the mobile unit 103 also includes all of the customary components of a standard analog cellular phone. Because such components are well known, they are not described here in detail.

This discussion will first focus on an exemplary embodiment of a mobile unit 103 for use in the analog system described above. Referring to FIG. 4, the mobile unit 103 includes circuitry for combining cellular telephone components with components necessary for interacting with the central site server 107. In connection with the cellular telephone components, the mobile unit 103 includes a cellular antenna 405, which acts as a wave guide for transmission and receipt of analog cellular radio frequency (RF) signals. The cellular antenna 405 is coupled to exchange the analog cellular RF signals with an RF modulator/demodulator 407. The RF modulator/demodulator 407 modulates outgoing analog signals onto cellular carrier radio frequencies in accordance with known techniques. One source of those outgoing signals is a microphone 409, which senses audio signals in the vicinity of the mobile unit 103.

Another source of outgoing signals is a dual-tone multifrequency (DTMF) generator 411. One input of the DTMF generator 411 is coupled to receive signals from a keypad 413. The DTMF generator 411 converts the keypad signals into analog tones in accordance with known techniques.

Another function of the RF modulator/demodulator 407 is to demodulate incoming analog signals from cellular carrier radio frequencies to baseband frequencies that are used by the mobile unit 103. The demodulated signals are supplied to a loudspeaker 415, which generates audible soundwaves that the user can hear. The mobile unit 103 may also be supplied with a headset 417 which allows the user to listen to the audio information without disturbing others and without having to hold the mobile unit 103 up to his ear for prolonged periods of time. Those skilled in the art will recognize that the loudspeaker 415 and the headset 417 are each means for supplying information to the mobile user, and that alternative embodiments may include other well-known means for performing this function.

Turning now to the components that provide the capability of interacting with the central site server 107, the mobile unit 103 further includes a GPS antenna 401 which acts as a wave guide for receipt of wireless GPS position signals. The GPS antenna 401 is coupled to supply these signals to a GPS receiver 403. It will be recognized that the GPS signals emanate from a plurality of GPS satellites 109 in accordance with known techniques.

The GPS receiver 403 converts the GPS signals into signals which represent the geographic position of the mobile unit 103. If enhanced resolution of the mobile unit's position is required, differential GPS techniques may be employed. The output of the GPS receiver 403 is supplied to an input of the DTMF generator 411, so that the position information can be transmitted, through the RF modulator/demodulator 407, cellular network 101 and terrestrial network 105 to the central site server 107.

The GPS receiver 403 is controlled by a control unit 431 and by position refresh circuitry 419. The control unit 431 is responsible for enabling and disabling overall operation of the GPS receiver 403. The position refresh circuitry 419 causes the GPS receiver 403 to receive and process position information at periodic time intervals which may be predefined, or which may alternatively be dynamically set.

To coordinate the actions of the mobile unit's cellular telephone components with those of the central site server-related components, the mobile unit 103 is further equipped with a remote DTMF isolation switch 433, a DTMF receiver 435, and a position subsystem interface (I/F) module 421. The RF modulator/demodulator 407 supplies an audio input signal to the remote DTMF isolation switch 433, which in turn supplies this signal to the DTMF receiver 435 and to the loudspeaker 415. The DTMF receiver 435 supplies this signal to the control unit 431 and to the position subsystem I/F module 421. An output of the control unit 431 is supplied to the remote DTMF isolation switch 433 to permit disabling of the remote DTMF isolation switch's output to the loudspeaker 415 or to the DTMF receiver 435. The position subsystem I/F module 421 is coupled to receive signals that are derived from the RF modulator/demodulator 407. In particular, the signals that the position subsystem I/F module 421 receives from the DTMF receiver 435 include the position request command and refresh interval transmitted by the central site server 107 (see description of FIGS. 3A and 3B, below). Each of these signals is transmitted by the central site server 107 in the form of DTMF tones.

The position subsystem I/F module 421, then, includes circuitry to enable it, during operation, to receive an initial position request command and a position refresh time interval value transmitted by the central site server 107, and, in response, to cause the position refresh circuitry 419 to initiate a position report. The position subsystem I/F module 421 also provides the position refresh circuitry 419 with the value of the received refresh interval, so that the position refresh circuitry 419 will repeat the position reporting function once every requested time interval.

The coupling between the position refresh circuitry 419 and the position subsystem I/F module 421 is bidirectional, so that the position subsystem I/F module 421 may receive notification of a pending position refresh from the position refresh circuitry 419. In another aspect of the invention, the mobile unit 103 is further equipped with a loudspeaker/headset isolation circuit 423 which controls a switch 425 that is interposed between the output of the DTMF generator 411 and an input of the loudspeaker 415. This configuration allows the control unit 431 to cause the loudspeaker/headset isolation circuit 423 to prevent the sound of the internallygenerated DTMF tones from emanating from the loudspeaker 415 (and/or the headset 417). It will be recognized that these DTMF tones represent the GPS position data that is being transmitted to the central site server 107. Were the loudspeaker/headset isolation circuit 423 not provided, then the GPS position data would periodically intrude upon the desired information being supplied to the user whenever a position refresh operation were performed.

Similarly, a microphone isolation circuit 437 and microphone switch 439 are provided to allow the output of the microphone 409 to be disconnected from the input of the RF modulator/demodulator 407. The microphone isolation circuit is controlled by a signal supplied by the control unit 431.

In accordance with another aspect of the invention, the control unit 431 is also coupled to receive a signal from a position reporting enable/disable switch 427. The signal from the position reporting enable/disable switch 427 causes the control unit 431 to either suspend or carry out position reporting from the mobile unit 103 to the central site server 107. This feature may be useful, for example, for allowing a user to prevent a remote system from surreptitiously activating the position reporting mechanism and determining the user's location. It also allows the user to operate the mobile unit as a standard telephone.

Referring back, now, to FIGS. 3A and 3B, one embodiment for operating the system will now be described. In step 301, the mobile unit 103, by dialing a telephone number assigned to the central site server 107, establishes a circuit-switched voice connection with the central site server 107 via the cellular telephone network 101 and terrestrial network 105. In response, the central site server 107 uses the established connection to transmit a menu of user information-type possibilities to the mobile unit 103 (step 302). In one aspect of the invention, the menu may be one that has been previously stored in a mass storage device associated with the central site server 107, and which represents this particular user's preferred selections from a larger menu of selection possibilities.

The menu may be stored in the form of digitized voice signals, which are transmitted to the mobile unit 103 for playback on the mobile unit's loudspeaker 415. Upon hearing the menu, the user makes one or more selections by pressing one or more buttons on the mobile unit's keypad 413, thereby causing corresponding dual-tone multifrequency (DTMF) signals to be transmitted back to the central site server 107 via the established circuit-switched voice connection. The final such button selection transmits a menu tone which signals to the central site server 107 that the user has completed the selection process (step 303). Alternatively, the user may simply speak the selection into the mobile unit's microphone if the central site server 107 is equipped with speech recognition equipment.

In step 304, the central site server 107 receives the selection signals from the mobile unit 103 and converts these into a digital data format for internal use by the central site server 107. The converted selection signals are then stored in a first data record associated with the mobile unit 103. Next, the central site server 107 uses the established circuit-switched voice connection to transmit an end of menu tone to the mobile unit 103 which, in conjunction with the menu tone sent by the mobile unit 103 (previous step 303), signals to the control unit 431 of the mobile unit 103 that both the user and the central site server 107 concur that the current menu selection phase has been completed (step 305). The control unit 431 instructs the remote DTMF isolation switch 433 to send all incoming traffic to the DTMF receiver 435, instructs the loudspeaker/headset isolation circuitry 423 to isolate the loudspeaker 415 from locally generated DTMF tones, and instructs the microphone isolation circuitry 437 to control the microphone switch 439 so as to disconnect the microphone output from the RF modulator 407 (step 306).

In step 307, the control unit of the mobile unit 103 instructs the DTMF generator 411 to generate an acknowledge tone to the central site server 107. The acknowledge tone acknowledges receipt of the end of menu tone.

The central site server 107 then transmits a request to the mobile unit 103 to initiate receipt and processing of position information (step 308). This transmission takes place via the established circuit-switched voice connection. In another aspect of the invention, the central site server 107 also informs the mobile unit 103 of a requested refresh interval, which specifies how frequently the mobile unit 103 is to reevaluate its position and transmit the reevaluated information to the central site server 107.

In response to receipt of the central site server's message, the control unit 431 of the mobile unit 103 instructs the remote DTMF isolation switch 433 to direct all future incoming traffic to the loudspeaker 415 and enables the GPS receiver 403 to initiate position reporting (step 309). The mobile unit 103 receives the signals from the GPS satellites 109, and processes these signals in accordance with known techniques to determine its present location (step 310). The mobile unit 103 also stores the value of the position refresh interval, if this was also received from the central site server 107.

After its position has been determined, the mobile unit 103 transmits the present location information to the central site server 107 in the form of a sequence of DTMF tones via the established circuit-switched voice connection (step 311). A timer is also set so that at the end of the position refresh interval, the process of determining position and transmitting this information to the central site server 107 will be repeated.

The central site server 107 receives the position information from the mobile unit 103 and converts this information into a digital data format. The converted position information may then be stored in a second data record associated with the mobile unit 103 (step 312). Storage of the position information may be useful, for example, if a user is being directed to go from point A to point B; in this case, the position trend information can be used to correct the user's motion if the user is going in the wrong direction. A history of the user's location may also be used to prevent information from again being sent to a grid location that the user has been in once before.

After (optionally) storing the position information, the central site server 107 uses the converted selection signals from the first data record and the position information stored in the second data record to access the selection/position table 201 and to retrieve therefrom the selected subset of information 203 (step 313). Of course, the information itself need not be stored in the selection/position table 201. Those having ordinary skill in the art will recognize that the selection/position table 201 may more conveniently hold only pointers to mass storage locations where the desired data is being retained. In any case, the retrieved information is then transmitted to the mobile unit 103 via the established circuit-switched connection (step 314). As a result of step 309, the mobile unit 103 will route this information to the loudspeaker 415 only.

When the mobile unit's timer goes off, the mobile unit 103 again determines its position and repeats steps 310 through 314 so long as the user does not assert a "return to menu" signal (described below) and the established circuit-switched connection is not terminated (step 315). Also during this time, the entries in the selection/position table 201 may be updated, if the nature of the information stored therein warrants periodic updating. In this manner, the mobile unit 103 will continue to receive the most recent information that corresponds to its present location, even if that location has changed since the last time the mobile unit 103 received information.

In accordance with another aspect of the invention, the user may cause the delivery of position-related information to cease by, for example, pressing a button on the mobile unit's keypad which causes the control unit 431 to instruct the remote DTMF isolation switch 433 to send all incoming traffic to both the loudspeaker and the DTMF receiver 435 (step 316) and causes a return to menu tone to be generated by the DTMF generator 411 and sent to the central site server 107 (step 317) by the RF modulator/demodulator 407. In response, the central site server 107 sends a return to menu phase signal to the mobile unit 103 (step 318) which indicates that the central site server 107 is ready to begin a new menu selection process. In step 319, the mobile unit 103 confirms receipt of the return to menu phase tone from the central site server 107 by generating and transmitting an acknowledge signal via the established circuit-switched connection. In addition, upon receipt of the return to menu phase signal from the central site server 107 and in conjunction with the return to menu signal from the keypad 413, the control unit 431 of the mobile unit 103 instructs the loudspeaker/headset isolation circuit 423 to permit locally generated DTMF tones to reach the loudspeaker, instructs the microphone isolation circuit 437 to connect the microphone 409 to the RF modulator 407, and instructs the GPS receiver 403 to disable position reporting (step 320).

The central site server 107 uses the established connection to retransmit a menu of user information-type possibilities to the mobile unit 103 (step 321). Upon hearing the menu, the user makes one or more selections by pressing one or more buttons on the mobile unit's keypad 413, thereby causing corresponding DTMF signals to be transmitted back to the central site server 107 via the established circuit-switched voice connection. The final such button selection transmits a menu tone that signals to the central site server 107 that the user has completed the selection process (step 322). Alternatively, the user may simply speak the selections into the mobile unit's microphone if the central site server 107 is equipped with speech recognition equipment.

In step 323, the central site server 107 receives the selection signals from the mobile unit 103 and converts these into a digital data format for internal use by the central site server 107. The converted selection signals are then stored in a first data record associated with the mobile unit 103. Next, the central site server 107 transmits an end of return to menu tone to the mobile unit 103 which, in conjunction with the menu tone sent by the mobile unit 103 (previous step 322), signals to the control unit 431 of the mobile unit 103 that both the user and the central site server 107 concur that the current menu selection phase has been completed (step 324). The control unit 431 instructs the remote DTMF isolation switch 433 to send all incoming traffic to the loudspeaker 415, instructs the loudspeaker/headset isolation circuitry 423 to isolate the loudspeaker 415 from locally generated DTMF tones, instructs the microphone isolation circuit 437 to disconnect the microphone 409 from the RF modulator 407, and instructs the GPS receiver 403 to enable position reporting (step 325). The control of the mobile unit 103 then returns to step 310 wherein the mobile unit 103 receives and processes position information (step 326).

Another way of terminating information delivery is for the user simply to terminate the telephone call (step 327). In this case, call termination is detected by the central site server 107, which then responds by ceasing information delivery to the particular mobile unit 103.

Figure 5:
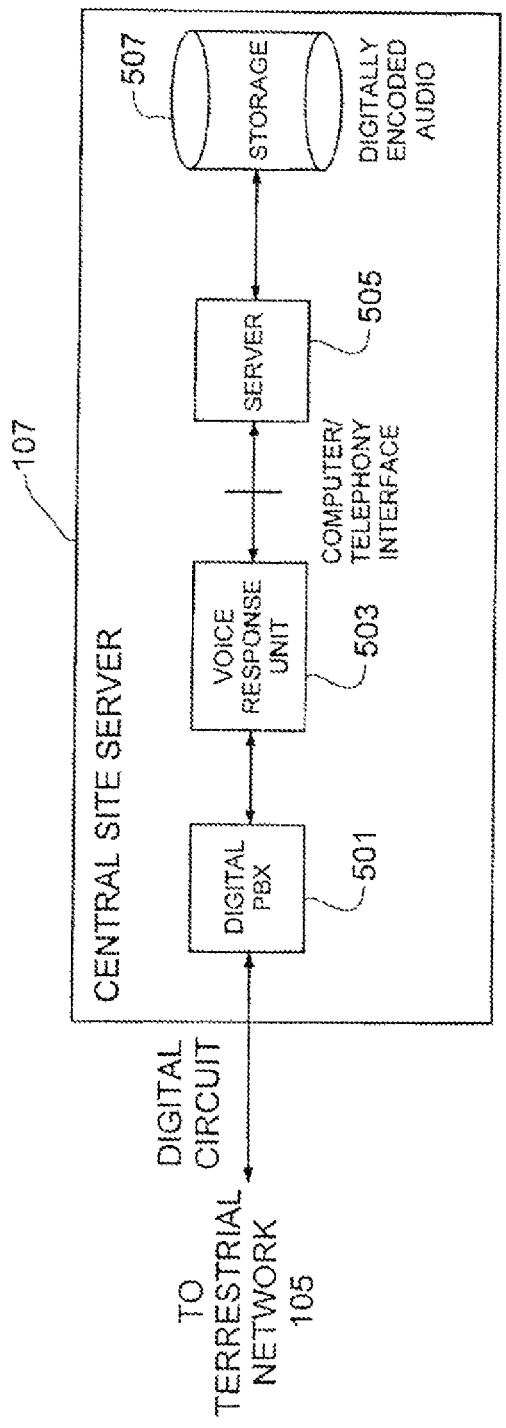
FIG. 5 is a block diagram of an exemplary embodiment of a central site server for use with an analog embodiment of the invention.

An exemplary embodiment of the central site server 107 for use with the above-described voice-oriented embodiment will now be described in greater detail with reference to FIG. 5. The central site server 107 is coupled to the terrestrial network 105 by means of a digital PBX 501 in accordance with well-known techniques. This permits the central site server 107 to be accessed from any location in which a telephone call can be initiated.

A second port of the digital PBX 501 is coupled to exchange signals with a voice response unit 503. The voice response unit 503 is a telephony end point device which accepts mobile unit call set-up requests.

In response to receipt and acceptance of a call set-up request, the voice response unit 503 sends an audio selection menu to the mobile unit 103. The audio selection menu may be stored at the voice response unit 503 in the form of digitized voice information. Although the audio selection menu may be standardized for use by all users, in an alternative embodiment the menu structure can be set up to recognize repeat customers and to adjust the options accordingly. This feature may require additional information, such as an inbound phone number or a user's personal identification number (PIN), to be obtained from the mobile unit 103. Also, whenever the mobile unit 103 sends DTMF tones to the central site server 107 (e.g., when the user makes a menu selection by pressing a button on the keypad 413, or whenever the mobile unit 103 sends DTMF-encoded position information to the central site server 107), it is the voice response unit 503 which converts the DTMF tones into the internally-used digital data format.

The voice response unit 503 further includes digital-to-analog (D/A) circuitry for converting digitally encoded audio data into the audio format that is used by the mobile unit 103.

Also coupled to the voice response unit 503 is a server 505 which maintains the selection/position table 201 for each caller, and retrieves the appropriate digitally-encoded audio narrative from a storage device 507.

Alternative embodiment employing digital cellular protocol

In an alternative embodiment, the cellular telephone network 101, as well as the circuitry within mobile unit 103 which communicates with the cellular telephone network 101, utilize a digital protocol, such as the Digital Advanced Mobile Phone Service (D-AMPS), which is utilized in the United States, or the Global System for Mobile Communication (GSM) system which is utilized in Europe. This embodiment uses the digital facilities of these new personal communications services (PCS) to deliver information to/from the mobile unit 103 in a digital format over the public switched telephone network or, in an alternative embodiment, over a public data network such as the Internet. It should be noted that the description of the mobile unit herein refers only to select components of the mobile unit 103. However, it should be noted that the mobile unit 103 should also include all of the customary components of a standard digital cellular telephone. A more detailed description of the operation of this exemplary system will now be described with respect to the flowchart of FIGS. 6A and 6B, and the block diagram of an alternative embodiment of the mobile unit 103 (designated herein as 103'), as depicted in FIG. 7.

Figure 7:
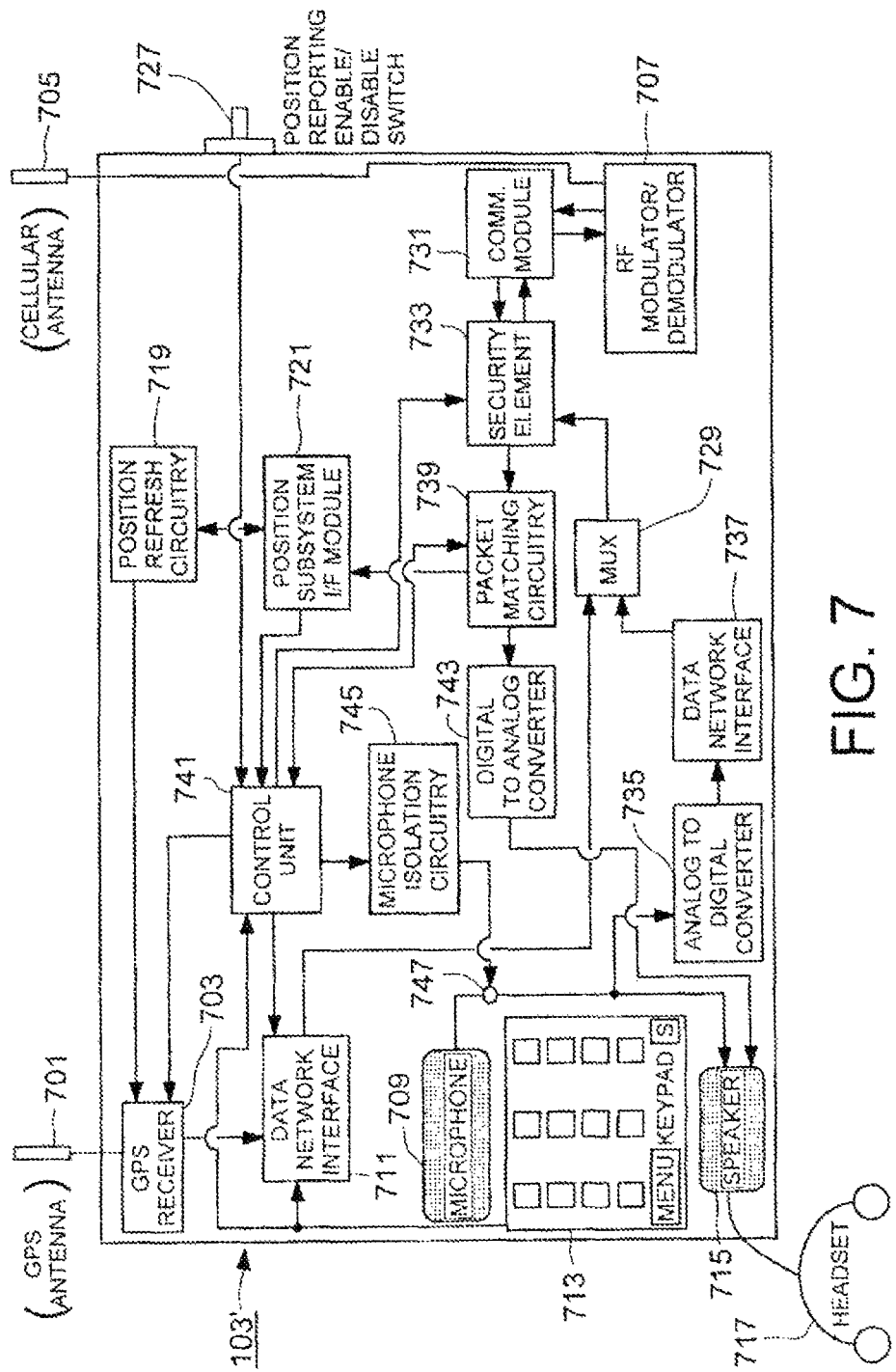
FIG. 7 is a block diagram of an exemplary mobile unit for use in a digital position-related information delivery system.

Turning first to FIG. 7, this discussion will now focus on an exemplary embodiment of a mobile unit 103' for use in the digital system described above. The mobile unit 103' includes circuitry for combining digital cellular telephone components with components necessary for interacting with the central site server 107'. In connection with the cellular telephone components, the mobile unit 103' includes a cellular antenna 705, which acts as a wave guide for transmission and receipt of digital cellular radio frequency (RF) signals. The cellular antenna 705 is coupled to exchange the digital cellular RF signals with an RF modulator/demodulator 707. The RF modulator/demodulator 707 receives outgoing signals from a communications module 731, and modulates these signals onto cellular carrier radio frequencies in accordance with known techniques. The communications module 731 adds communication protocol headers to the outgoing packets (e.g., headers for sending data in a transport control protocol/internet protocol (TCP/IP) network) and removes the communications-related headers from incoming packets. The communications module 731 supplies incoming packets to, and receives outgoing packets from a security element 733. The security element 733 may operate in either pass-through mode or in secure mode. When a secure connection is not requested by the user and is not otherwise required by the central site server 107', then the incoming and outgoing digital traffic is not modified as it passes through the security element 733. For performing security functions, the security element 733 utilizes an authentication and key exchange protocol, and includes the following well-known elements (not shown): private key; public key crypto algorithm; public key certificate; symmetric key crypto algorithm; hash algorithm; certification authority certificate(s); and random number generator.

The security element 733 receives outgoing packets from a multiplexor 729, which in turn receives outgoing packets from one of two sources. One source of those outgoing packets is a microphone 709, which senses audio signals in the vicinity of the mobile unit 103'. The microphone 709 supplies its signal to an analog to digital converter 735, whose output is supplied to a first data network interface unit 737. The first data network interface unit 737 packetizes the digitized voice data, and generates addressing for the packets where necessary to identify the source component and the destination component. Another source of outgoing signals is a keypad 713, coupled to a second data network interface unit 711. The output of the second data network interface unit 711 is supplied to a second input of the multiplexor 729. The keypad 713 may be any standard telephone keypad for use in digital mobile telephones. The illustrated embodiment does not include a separate analog system for generating DTMF tones. However, in alternate embodiments such circuitry may be advantageous for enabling a user to interface with devices, such as telephone answering machines, that expect to receive DTMF tones.

Another function of the RF modulator/demodulator 707 is to demodulate incoming digital signals from cellular carrier radio frequencies to baseband frequencies that are used by the mobile unit 103'. The demodulated signals are supplied to the communications module 731, which removes the communications stack from the incoming packets. After passing through the security element 733, the received packets are supplied to a packet matching circuit 739 which receives search parameters from a control unit 741. The search parameters may include bit strings, packet header addresses, and the like. For example, the search parameters may designate that the next correct input from the central site server 107' is an "end of return to menu" packet. The packet matching circuit 739 compares the received input data stream with the packet search parameters, and diverts the received packet to a particular output port whenever a match is detected. A control signal confirming the match is sent to the control unit 741. If the received data packet does not match the search parameters the received packet is dropped from the traffic stream.

If the received packet is voice data, the packet matching circuit 739 passes it to a digital to analog converter 743 whose analog output signal is then supplied to a loudspeaker 715. The loudspeaker 715 generates audible soundwaves that the user can hear. The mobile unit 103' may also be supplied with a headset 717 which allows the user to listen to the audio information without disturbing others and without having to hold the mobile unit 103' up to his ear for prolonged periods of time.

Turning now to the components that provide the capability of interacting with the central site server 107', the mobile unit 103' further includes a GPS antenna 701 which acts as a wave guide for receipt of wireless GPS position signals. The GPS antenna 701 is coupled to supply these signals to a GPS receiver 703. It will be recognized that the GPS signals emanate from a plurality of GPS satellites 109 in accordance with known techniques.

The GPS receiver 703 converts the GPS signals into signals which represent the geographic position of the mobile unit 103'. If enhanced resolution of the mobile unit's position is required, differential GPS techniques may be employed. The output of the GPS receiver 703 is supplied to an input of the second data network interface unit 711, which packetizes the position data, and generates addressing for the packets where necessary. Under the direction of the control unit 741, the second data network interface unit 711 is also capable of generating certain packets, such as an acknowledge signal, as will be described in greater detail below. As described above, the output packets from the second data network interface unit 711 are supplied to a second input of the multiplexor 729, so that the position information can be transmitted, through the RF modulator/demodulator 707, digital cellular network 101 and terrestrial network 105 to the central site server 107'.

The GPS receiver 703 is controlled by the control unit 741 and by position refresh circuitry 719. The control unit 741 determines whether operation of the GPS receiver 703 will be enabled or disabled. The position refresh circuitry 719 causes the GPS receiver 703 to receive and process position information at periodic time intervals which may be predefined, or which may alternatively be dynamically set.

To coordinate the actions of the mobile unit's cellular telephone components with those of the central site server-related components, the mobile unit 103' is further equipped with a position subsystem interface (I/F) module 721. The position subsystem I/F module 721 is coupled to receive signals from the packet matching circuit 739. These signals include the position request command and position refresh interval value transmitted by the central site server 107' (see description of step 615 in FIGS. 6A and 6B).

The position subsystem I/F module 721, then, includes circuitry to enable it, during operation, to receive an initial position request command and a refresh time interval transmitted by the central site server 107', and, in response, to cause the position refresh circuitry 719 to initiate a position report. The position subsystem I/F module 721 also provides the position refresh circuitry 719 with the value of the received position refresh interval, so that the position refresh circuitry 719 will repeat the position reporting function once every requested time interval. The position subsystem I/F module 721 also sends control signals to the control unit 741 which informs the control unit 741 of the receipt of a position request command from the central site server 107'.

The coupling between the position refresh circuitry 719 and the position subsystem I/F module 721 is bidirectional, so that the position subsystem I/F module 721 may receive notification of a pending position refresh from the position refresh circuitry 719. In another aspect of the invention, the mobile unit 103' is further equipped with a microphone isolation circuit 745 which controls a switch 747 that is interposed between the output of the microphone 709 and an input of the loudspeaker 715 and of the analog to digital converter 735. This configuration allows the control unit 741 to cause the microphone isolation circuit 745 to prevent the sound signals from the microphone 709 from emanating from the loudspeaker 715 (and/or the headset 717) and prevents the sound signals from being conducted to the central site server 107'.

In accordance with another aspect of the invention, the control unit 741 is also coupled to receive a signal from a position reporting enable/disable switch 727. The signal from the position reporting enable/disable switch 727 causes the control unit 741 to either suspend or carry out position reporting from the mobile unit 103' to the central site server 107'.

Referring back, now, to FIGS. 6A and 6B, one embodiment for operating the system will now be described. In step 601, the mobile unit 103', by dialing a telephone number assigned to the central site server 107', establishes a circuit-switched data connection with the central site server 107' via a digital PCS, cellular digital packet data (CDPD), or similar packetized data network 101 and a terrestrial network 105. In response, the central site server 107' uses the established connection to transmit a query asking whether the user wishes to establish a secure connection (step 602).

At step 603, the user transmits a response by depressing the indicated button on the keypad 713 which generates a signal that is placed into a packet by the second data network interface unit 711. The packet is then transmitted to the central site server 107' via the circuit-switched data connection. Alternatively, the user may simply provide a voice response which is digitized by the analog to digital converter 735 and packetized by the first data network interface unit 737, if speech recognition equipment is available at the central site server 107'.

If the user indicates that a secure connection is not desired and the central site server 107' does not require a secure connection, operation continues at step 609 (described below). However, if a secure connection is desired by the user or required by the central site server 107', then the process continues at step 604, where the central site server 107' uses the established circuit-switched data connection to send its public key certificate to a security unit contained within the mobile unit 103'.

In step 605, the mobile unit 103' uses the established circuit-switched data connection to transmit back to the central site server 107' a message that includes a challenge field encrypted using the public key of the central site server 107' and the mobile unit's public key certificate. Next, at step 606, the central site server 107' decrypts the challenge field that was received from the mobile unit 103' in step 605, and sends both the challenge field and a symmetric key back to the mobile unit 103' via the established circuit-switched data connection. This message is transmitted in an encrypted form using a public key envelope. Upon receipt of the message, the security element in the mobile unit 103' decrypts the public key envelope and stores the symmetric key for use in all future transmissions with the central site server 107' for the duration of the call (step 607). That is, all subsequent transmissions with the mobile unit 103' will be encrypted using the symmetric key.

The mobile unit 103' encrypts the challenge field originally transmitted in step 605 using the symmetric key and sends the encrypted challenge to the central site server 107' (step 608).

After receiving the message in step 608, or alternatively after learning, in step 603, that the user does not wish to use a secure connection, the central site server 107' uses the established connection to transmit a menu of user information-type possibilities to the mobile unit 103' (step 609). It will be recognized that this transmission, as well as all further communications between the mobile unit 103' and the central site server 107', are encrypted, thereby requiring decryption, if the user elected, in step 603, to use a secure connection.

In one aspect of this invention, the menu may be one that has been previously stored in a mass storage device associated with the central site server 107', and which represents this particular user's preferred selections from a larger menu of selection possibilities.

The menu may be stored in the form of digitized audio signals, which are transmitted as packets to the mobile unit 103' for playback on the mobile unit's loudspeaker 715 or headset 717. Upon hearing the menu, the user makes one or more selections by pressing one or more buttons on the mobile unit's keypad 713, thereby causing data packets to be sent back to the central site server 107' via the established circuit-switched data connection (step 610). The final such selection indicates that the user is terminating the selection process. Alternatively, the user may simply speak the selection into the mobile unit's microphone 709 if the central site server 107' is equipped with speech recognition equipment. The transmission of the user's selections to the central site server 107' is made by way of the digital PCS, CDPD, or similar network 101 and terrestrial network 105.

In step 611, the central site server 107' stores the selections received from the mobile unit 103' in a first data record associated with the mobile unit 103'. Next, the central site server 107' sends a packet confirming the termination of the menu selection phase (step 612). In step 613, the control unit 741 instructs the microphone isolation circuit 745 to isolate the microphone 709 from the analog-to-digital converter 735 (and therefore from the multiplexor 729 as well) and instructs the packet matching circuit 739 to send all incoming packets to the position subsystem interface module. The mobile unit 103' sends an acknowledge packet to the central site server 107' indicating readiness for the next phase of operation (step 614).

Next, the central site server 107' transmits, via the established circuit-switched data connection, a request to the mobile unit 103' to initiate receipt and processing of position information (step 615). In another aspect of the invention, the central site server 107' also informs the mobile unit 103' of a requested refresh interval, which specifies how frequently the mobile unit 103' is to reevaluate its position and transmit the reevaluated information to the central site server 107'.

In response to receipt of the central site server's message, the control unit 741 of the mobile unit 103' instructs the packet matching circuitry to send all incoming packets to the digital to analog converter 743 for further transmission to the loudspeaker 715 and/or headset 717 and enables the GPS receiver 703 to initiate position reporting (step 616). The mobile unit 103' receives the signals from the GPS satellites 109, and processes these signals in accordance with known techniques to determine its present location (step 617). The mobile unit 103' also stores the value of the refresh interval, if this was also received from the central site server 107'.

After its position has been determined, the mobile unit 103' transmits this information to the central site server 107' via the established circuit-switched data connection (step 618). A timer is also set so that at the end of the position refresh interval, the process of determining position and transmitting this information to the central site server 107' will be repeated.

The central site server 107' receives the position information from the mobile unit 103' and stores this in a second data record associated with the mobile unit 103' (step 619). The central site server 107' then uses the selections recorded in the first data record and the position information stored in the second data record to access the selection/position table 201 and to retrieve therefrom the selected subset of information 203 (step 620). Those having ordinary skill in the art will recognize that the selection/position table 201 may more conveniently hold only pointers to mass storage locations where the desired data is being retained. In any case, the retrieved information is then transmitted to the mobile unit 103' via the established circuit-switched data connection (step 621).

When the mobile unit's timer goes off, the mobile unit 103' again determines its position and repeats steps 617 through 621 so long as the user does not assert a "return to menu" signal (described below) and the established circuit-switched connection is not terminated (step 622). Also during this time, the entries in the selection/position table 201 may be updated, if the nature of the information stored therein warrants periodic updating. In this manner, the mobile unit 103' will continue to receive the most recent information that corresponds to its present location, even if the location has changed since the last time it received information.

In accordance with another aspect of the invention, the user may press a button on the mobile unit's keypad 713 (step 650) which causes the mobile unit 103' to send a packet to the central site server 107' indicating the user's desire to halt the receipt of information and return to the menu selection phase (step 623). Also, as part of step 650, the control unit 741 instructs the packet matching circuitry 739 to send data packets to the loudspeaker 715 or the control unit 741 and instructs the microphone isolation circuit 745 to connect the microphone 709 to the analog to digital converter 735 (and therefore to the multiplexor 729 as well). In step 624, the central site server 107' ceases the delivery of information content and responds with a confirmation packet. The mobile unit 103' generates and transmits an acknowledge signal in order to acknowledge receipt of the confirmation packet (step 625). The control unit 741, having received the user's input of step 623 and the central site server's confirmation packet of step 624, responds by instructing the GPS receiver 703 to halt the delivery of position refresh to the data network interface (step 626).

In step 627, the central site server 107' uses the established connection to transmit a menu of user information-type options to the mobile unit 103' (step 627). Upon hearing the menu, the user makes one or more selections by pressing one or more buttons on the mobile unit's keypad 713, thereby causing data packets to be sent back to the central site server 107' via the established circuit-switched data connection (step 628). The final such selection indicates that the user is terminating the selection process. Alternatively, the user may simply speak the selection into the mobile unit's microphone if the central site server 107' is equipped with speech recognition equipment. The transmission of the user's selections to the central site server 107' is made by way of the digital PCS, CDPD, or similar network 101 and terrestrial network 105.

In step 629, the central site server 107' stores the new selections received from the mobile unit 103' in the first data record associated with the mobile unit 103'. Next, the central site server 107' sends a packet confirming the termination of the menu selection phase (step 630). In step 631, the control unit 741 instructs the GPS receiver 703 to resume the delivery of position refreshes, directs that packets/content go to the loudspeaker 715 only, and directs the microphone isolation circuitry 745 to disconnect the microphone 709 from the loudspeaker 715 and the analog to digital converter 735 (and therefore from the multiplexor 729 as well). The mobile unit 103' sends an acknowledge packet to the central site server 107' indicating readiness for the next phase of operation (step 632). The mobile unit 103' returns to the state set forth in step 617 (step 633).

Another way of terminating information delivery is for the user simply to terminate the telephone call (step 634). In this case, call termination is detected by the central site server 107', which then responds by ceasing information delivery to the particular mobile unit 103'.

Figure 8:
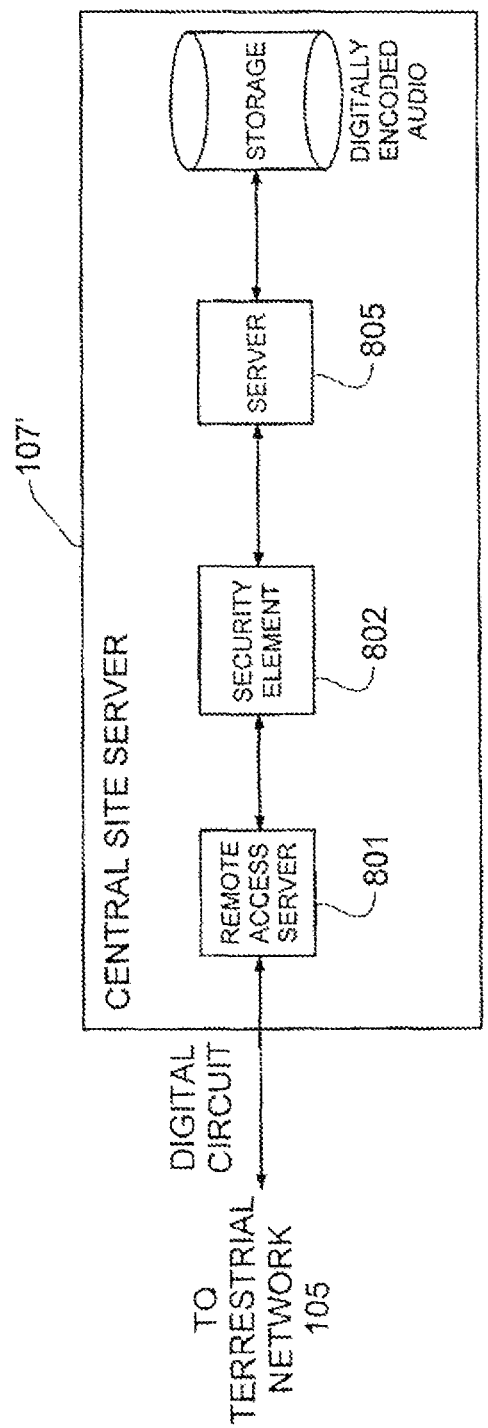
FIG. 8 is a block diagram of an exemplary embodiment of a central site server for use with a digital embodiment of the invention.

An exemplary embodiment of a central site server 107' for use with the above-described digital embodiment will now be described in greater detail with reference to FIG. 8. The central site server 107' is coupled to the terrestrial network 105 by means of a remote dial-up access server 801 in accordance with well-known techniques. This permits the central site server 107' to be accessed from any location in which a digital PCS, CDPD or other circuit-switched packet data call can be initiated.

A second interface of the remote access server 801 is coupled to a security element 802. The remote access server 801 supplies incoming data packets to a security element 802 and receives outgoing data packets from the security element 802. The security element 802 may operate in either pass-through mode or in secure mode. When a secure connection is not requested by the user, then the incoming and outgoing digital traffic is not modified as it passes through the security element 802. For performing security functions, the security element 802 utilizes an authentication and key exchange protocol, and includes the following well-known elements (not shown): private key; public key crypto algorithm; public key certificate; symmetric key crypto algorithm; hash algorithm; certification authority certificate(s); and random number generator.

A second interface of the security element 802 is coupled to a server 805. The security element 802 supplies incoming data packets to the server 805 and receives outgoing data packets from the server 805. The server 805 maintains the selection/position table 201 for each caller, and retrieves the appropriate digitally-encoded audio narrative or data/multimedia presentation from a storage device 807.

In accordance with another aspect of the invention, the system for delivering position-related information to a mobile user may further include a universal emergency response capability. In response to receipt of an emergency response request from the mobile unit 103, the central site server 107 contacts an emergency operations center and transmits the location of the mobile unit 103 to an emergency center. The central site server 107 also forwards the connection with the mobile unit 103 to the emergency operations center in order to permit two-way real-time communication between the customer (mobile user) and the emergency operations center. During this communication, the central site server 107 may further provide the emergency operations center with continuous updates of the customer's position. This system is applicable to pedestrians as well as to customers riding in vehicles.

From the descriptions above, a number of advantages of the inventive mobile unit information system become evident. First, the information available to the user is not dependent on the loading of a storage device on the mobile platform or individual. Wherever the mobile unit is taken, information is available on short notice and effortlessly linked to the mobile unit's location. No agency or establishment has to pre-position a device, sign, literature or sensor in advance of the mobile unit's arrival. Perishable information is updated as events occur, thereby avoiding becoming quickly outdated, in contrast to information that is pre-positioned within the mobile unit.

Another advantage is the fact that the information requested is available year round and at all hours of the day.

Still another benefit of the invention is the fact that the range of information available is broad and can be tailored to the desires and needs of the mobile unit operator. Last minute decisions about itineraries and routes are easily accommodated because information is provided in correspondence with the user's actual position, as opposed to basing it on an expected position that may or may not be accurate.

Also, the light weight, easily hand carried mobile unit 103 permits operation where vehicles could not pass or are not permitted. Likewise, emergencies which occur away from a base station or vehicle can be reacted to with vast amounts of pertinent site specific information made rapidly available to responding units or agencies.

The invention has been described with reference to a particular embodiment. However, it will be readily apparent to those skilled in the art that it is possible to embody the invention in specific forms other than those of the preferred embodiment described above. This may be done without departing from the spirit of the invention. For example, the system is not limited to use of the GPS, but may alternatively employ other universal positioning information sources. In one alternative embodiment, the universal positioning information source may be a positioning system that responds to a first signal transmitted by the mobile unit 103 by generating raw position signals and transmitting these back to the mobile unit 103. The mobile unit 103 may generate the present position information from the received position signals, and transmit the present position information to the central site server 107 as described above. Alternatively, the mobile unit 103 may forward the position signals to the central site server, and the central site server may include means for generating the present position information from the position signals.

In another alternative, the positioning system may respond to receipt of the first signal from the mobile unit 103 by sending information directly to the central site server 107 instead of to the mobile unit 103. The information may be the raw position signals, in which case the central site server 107 includes means for generating the present position information from the received position signals. Alternatively, the positioning system may generate usable present position information itself, and transmit this directly to the central site server 107. The positioning system in this case also transmits a signal identifying this particular mobile unit 103, so that the central site server 107 can associate the received present position information with this mobile unit's connection.

In another variation, the positioning system, in response to receipt of the first signal from the mobile unit 103, generates the usable present position information and transmits this back to the mobile unit 103, which then forwards the present information to the central site server 107.

Furthermore, the system can accommodate output devices which are digital or analog, including laptop PCs, hand-held video receivers, 3-D multimedia audio/visual headsets, and the like. Thus, the user need not be restricted to reception of only voice or text information, but may use any of a variety of well-known means for supplying response information.

The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A mobile communication device configured to selectively report position information, comprising:
    a receiver configured to receive position signals;
    a processor coupled to the receiver and responsive to the position signals to determine position information indicative of a present position of the mobile communication device;
    a modulator/demodulator configured to automatically transmit the position information to a destination over a communication network in accordance with a reporting schedule;
    a control unit configurable by a user to selectively override at least one scheduled transmission of the position information to prevent transmission of the position information while the mobile communication device is operational; and
    an enable/disable switch coupled to the control unit to selectively enable and disable transmission of the position information.

2. The mobile communication device of claim 1, wherein the control unit selectively enables and disables transmission of the position information according to a command signal input by the user of the mobile communication device.

3. The mobile communication device of claim 1, wherein the enable/disable switch is a physical switch that can be actuated by the user to selectively enable and disable transmission of the position information.

4. The mobile communication device of claim 1, wherein the processor periodically determines the position information in accordance with a refresh interval.

5. The mobile communication device of claim 4, wherein the control unit overrides the refresh interval when transmission of the position information is disabled.

6. The mobile communication device of claim 1, further comprising:
    a user interface that permits a user of the mobile communication device to communicate over a communication network, wherein the modulator/demodulator transmits communication signals received from the user interface and supplies received communication signals to the user interface.

7. The mobile communication device of claim 1, wherein the receiver is a global positioning system (GPS) receiver.

8. A method of selectively reporting position information from a mobile communication device, comprising:
    receiving position signals;
    determining position information in response to the position signals, the position information indicating a present position of the mobile communication device;
    transmitting the position information automatically to a destination over a communication network in accordance with a reporting schedule; and
    selectively overriding, in accordance with a setting configurable by a user of the mobile communication device, at least one scheduled transmission of the position information to prevent transmission of the position information while the mobile communication device is operational, wherein selectively enabling and disabling the transmission of the position information is performed in accordance with an enable/disable switch configurable by the user.

9. The method of claim 8, wherein selectively enabling and disabling the transmission of the position information is performed in accordance with a command signal input by the user of the mobile communication device.

10. The method of claim 8, wherein the enable/disable switch configurable is a physical switch that can be actuated by the user.

11. The method of claim 8, wherein determining the position information is performed periodically in accordance with a refresh interval.

12. The method of claim 11, wherein selectively enabling and disabling the transmission of the position information overrides the refresh interval when transmission of the position information is disabled.

13. The method of claim 8, further comprising:
transmitting communication signals received from a user via a user interface over the communication network; and
supplying communication signals received over the communication network to the user via the user interface.

14. The method of claim 8, wherein the received position signals are global positioning system (GPS) signals.

15. A mobile communication device for selectively reporting position information, comprising:
means for receiving position signals;
means for determining position information in response to the position signals, the position information indicating a present position of the mobile communication device;
means for automatically transmitting the position information to a destination over a communication network in accordance with a reporting schedule; and
means for selectively overriding, in accordance with a setting configurable by a user of the mobile communication device, at least one scheduled transmission of the position information to prevent transmission of the position information while the mobile communication device is operational, wherein the means for selectively enabling and disabling comprises switching means configurable by the user to toggle between an enable and disable state.

16. The mobile communication device of claim 15, wherein the means for selectively enabling and disabling is configured to selectively enable and disable the transmission of the position information in accordance with a command signal input by the user of the mobile communication device.

17. The mobile communication device of claim 15, wherein the switching means is a physical switch that can be actuated by the user.

18. The mobile communication device of claim 15, wherein the means for determining position information periodically determines the position information in accordance with a refresh interval.

19. The mobile communication device of claim 18, wherein the means for selectively enabling and disabling the transmission of the position information overrides the refresh interval when transmission of the position information is disabled.

20. The mobile communication device of claim 15, further comprising:
user interface means for permitting a user of the mobile communication device to communicate over a communication network, wherein the means for transmitting the position information transmits communication signals received from the user interface means and supplies received communication signals to the user interface means.

21. The mobile communication device of claim 15, wherein the received position signals are global positioning system (GPS) signals.

22. A non-transitory computer-readable medium comprising program code, which, when executed by a machine, cause the machine to perform operations for selectively reporting position information from a mobile communication device, the non-transitory computer-readable medium comprising:
program code to receive position signals;
program code to determine position information in response to the position signals, the position information indicating a present position of the mobile communication device;
program code to automatically transmit the position information to a destination over a communication network in accordance with a reporting schedule; and
program code to selectively override, in accordance with a setting configurable by a user of the mobile communication device, at least one scheduled transmission of the position information to prevent transmission of the position information while the mobile communication device is operational, wherein a program code to selectively enable and disable is configured to selectively enable and disable the transmission of the position information in accordance with a switch configurable by the user to toggle between an enable and disable state.

23. The non-transitory computer-readable medium of claim 22, wherein the program code to selectively enable and disable is configured to selectively enable and disable the transmission of the position information in accordance with a command signal input by the user of the mobile communication device.

24. The non-transitory computer-readable medium of claim 22, wherein the switch is a physical switch that can be actuated by the user.

25. The non-transitory computer-readable medium of claim 22, wherein the program code to determine position information periodically determines the position information in accordance with a refresh interval.

26. The non-transitory computer-readable medium of claim 22, wherein the program code to selectively enable and disable the transmission of the position information overrides the refresh interval when transmission of the position information is disabled.

27. The non-transitory computer-readable medium of claim 22, further comprising:
program code to operate a user interface that permits a user of the mobile communication device to communicate over a communication network, wherein program code to transmit the position information transmits communication signals received from the user interface and supplies received communication signals to the user interface.

28. The non-transitory computer-readable medium of claim 22, wherein the received position signals are global positioning system (GPS) signals.

* * * * *